United States Patent
Hoppensteadt et al.

(10) Patent No.: US 6,957,204 B1
(45) Date of Patent: Oct. 18, 2005

(54) OSCILLATARY NEUROCOMPUTERS WITH DYNAMIC CONNECTIVITY

(75) Inventors: Frank C. Hoppensteadt, Paradise Valley, AZ (US); Eugene Izhikevich, San Diego, CA (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 09/831,812

(22) PCT Filed: Nov. 12, 1999

(86) PCT No.: PCT/US99/26698

§ 371 (c)(1),
(2), (4) Date: Jul. 30, 2001

(87) PCT Pub. No.: WO00/29970

PCT Pub. Date: May 25, 2001

Related U.S. Application Data
(60) Provisional application No. 60/108,353, filed on Nov. 13, 1998.

(51) Int. Cl.$^7$ .............................................. G06F 15/18
(52) U.S. Cl. ............................................. 706/26; 706/15
(58) Field of Search .................................... 706/25–27

(56) References Cited

U.S. PATENT DOCUMENTS

| | | | |
|---|---|---|---|
| 4,660,166 A | * 4/1987 | Hopfield | 708/801 |
| 4,815,475 A | * 3/1989 | Burger | 600/554 |
| 4,926,064 A | * 5/1990 | Tapang | 706/26 |
| 5,072,130 A | * 12/1991 | Dobson | 706/26 |
| 5,263,122 A | * 11/1993 | Nunally | 706/41 |
| 5,446,828 A | * 8/1995 | Woodall | 706/25 |
| 5,479,577 A | * 12/1995 | Yang | 706/26 |
| 5,705,956 A | * 1/1998 | Neely | 331/25 |

OTHER PUBLICATIONS

Synchronization of MEMS resonators and mechanical neurocomputing Hoppenstedt, F.C.; Izhikevich, E.M.;Circuits and Systems I: Fundamental Theory and Applications, IEEE Transactions on vol.: 48, Issue: 2, Feb. 2001 pp.: 133–138.*

Recurrent oscillatory networks of associative memory with Hebbian learning algorithm Kuzmina, M.; Manykin, E.; Surina, I.;Neuroinformatics and Neurocomputers, 1995., Second International Symposium on , Sep. 20–23, 1995 pp.: 246–253..*

Influence of stimuli on the comportment of an artificial neural population Druaux, F.; Gorka, M.; Faure, A.; Neuroinformatics and Neurocomputers, 1992., RNNS/IEEE Symposium on , Oct. 7–10, 1992 pp.: 846–854 vol. 2.*

(Continued)

*Primary Examiner*—Anthony Knight
*Assistant Examiner*—Michael B. Holmes
(74) *Attorney, Agent, or Firm*—Gallagher & Kennedy, P.A.; Thomas D. MacBlain

(57) ABSTRACT

A neurocomputer (50) comprises n oscillating processing elements (60A, 60B, 60C, 60D and 60E) that communicate through a common medium (70) so that there are required only n connective junctions (80A, 80B, 80C, 80D and 80E). A rhythmic external forcing input (90) modulates the oscillatory frequency of the medium (70) which, in turn, is imparted to the n oscillators (60A, 60B, 60C, 60D and 60E). Any two oscillators oscillating at different frequencies may communicate provided that input's power spectrum includes the frequency equal to the difference between the frequencies of the two oscillators in question. Thus, selective communication, or dynamic connectivity, between different neurocomputer oscillators occurs due to the frequency modulation of the medium (70) by external forcing.

42 Claims, 12 Drawing Sheets

OTHER PUBLICATIONS

Comparative estimation of the role of specific and unspecific inputs at the arrangement of barrels interaction in the rat somatic cortexSukhov, A.G.; Neuroinformatics and Neurocomputers, 1995., Second International Symposium on , 1995 pp.: 207–209.*

Study of the role of rhythmic activity in fixation and reproduction of information on the model of neuronlike elements network Shulgina, G.I.; Neuroinformatics and Neurocomputers, 1992., RNNS/IEEE Symposium on , 1992 pp.: 1098–1106 vol. 2.*

Pattern recognition via synchronization in phase–locked loop neural networks Hoppensteadt, F.C.; Izhikevich, E.M.; Neural Networks, IEEE Transactions on ,vol.: 11 , Issue: 3 , May 2000 pp.: 734–738.*

Diffusion bay simulation and its impact on the overall FAB performance: a simplified exampleCollins, D.W.; Flores–Godoy, J.–J.; Tsakalis, K.S.; Hoppensteadt, F.C.; Semiconductor Manufacturing, 2003 IEEE International Symposium on , pp.: 315–318.*

Thalamo–cortical interactions modeled by forced weakly connected oscillatory networks Hoppensteadt, F.C.; Izhikevich, E.M.; Neural Networks, 1997., International Conference on ,vol.: 1 , Jun. 9–12, 1997, pp.: 328–331 vol. 1.*

Canonical models for mathematical neuroscience Hoppensteadt, F.C.; Izhikevich, E.M.; Neural Networks,1997., International Conference on ,vol.: 1 , Jun. 9–12, 1997 pp.: 324–327 vol. 1.*

Investigation of minimum inventory variability scheduling policies in a large semiconductor manufacturing facility Collins, D.W.; Hoppensteadt, F.C.;American Control Conference, 1997. Proceedings of the 199, vol.: 3 , 1997, pp.: 1924–1928.*

Associative memory of weakly connected oscillators Hoppensteadt, F.C.; Izhikevich, E.M.; Neural Networks,1997., International Conference on, vol.: 2, Jun. 9–12, 1997, pp.: 1135–1138 vol. 2.*

Computer simulation of a neural prism Hoppensteadt, F.C.; Circuits and Systems, 1989., Proceedings of the 32nd Midwest Symposium on , Aug. 14–16, 1989, pp.: 238–239 vol. 1.*

Fast numerical integration of relaxation oscillator networks based on singular limit solutions Linsay, P.S.; DeLiang L. Wang; Neural Networks, IEEE Transactions on , vol.: 9 Issue: 3 , May 1998 Page(s): 523–532.*

The dynamics of coupled nonlinear oscillators: from relaxation oscillators to neurons Linsay, P.S.; Brailove, A.A.; Gaudiano, P.; Przybyszewski, A.; Wilson, C.; Circuits and Systems, 1996 IEEE Intl. Symposium on , vol.: 3 Page(s) 138–141.*

Adaptive Synchronization of Neural and Physical Oscilators, Kenji Doya, Shuji Yoshizawa, Advances in Neural Information Processing Systems 4, 109–116, (1992).*

Designing Rhythmic Motions using Neural Oscillators, MJatthew . Williamson, Proceeding of the 1999 IEEE/RSJ International Conference on Intelligent Robots and Systems, IEEE, pps. 494–500.*

Rhythmic Robot Arm Control Using Oscillators, Matthew M. Williamson, Proceedings of the 1998 IEEE/RSJ International Conference on Intelligent Robots and Systems, IEEE pps. 77–83.*

Hopfield, J. J., "Neural networks and physical systems with emergent collective computational abilities" Proc. Natl. Acad. Sci. USA, vol. 79, pp. 2554–2558, Apr. 1982.

Hoppensteadt, F. C., Izhikevich, E. M., "Oscillatory Neurocomputers with Dynamic Connectivity" Physical Review Letters, vol. 81, No. 14, Apr. 5, 1999.

Linares–Barranco, B. et al., "CMOS Analog Neural Network Systems Based On Oscillatory Neurons" 1992 IEEE Intl. Symposium, vol. 1 of 6, pp. 2236–2238.

Kurokawa, H. et al., "A Local Connected Neural Oscillator Network for Sequential Character Segmentation" 1997 IEEE Intl. Conf. on Neural Networks, pp. 838–843, Jun. 9–12.

Buhmann, J. et al., "Sensory Segmentation by Neural Oscillators" IJCNN, vol. 1, pp. II603–607, Jul. 8–12, 1991.

Endo, S. et al., "Neural Network with Interacting Oscillators to Generate Low Frequency Rhythm" IEEE Intl. Conf., vol. 12, pp. 1445–1446, Nov. 1–4, 1990.

Lange, T. E. et al., "Phase–Locking of Artificial Neural Oscillators Can Perform Dynamic Role–Binding and Inferencing" IJCNN, vol. 1, p. II595, Jun. 18–22, 1989.

Wang, DeLiang "An Oscillation Model of Auditory Stream Segregation" IAPR, vol. III, pp. 198–200, Oct. 9–13, 1994.

Liu, Wei–Ping et al. "Phase–Locked Loop with Neurocontroller" SICE, pp. 1133–1138. Jul. 20–31, 1998.

Grossberg, S. "Nonlinear Neural Networks: Principles Mechanisms, and Architectures", Neural Networks, vol. 1, No. 1, pp. 17–61, 1988.

* cited by examiner

OSCILLATORY NEUROCOMPUTERS WITH DYNAMIC CONNECTIVITY

The present application is a 371 of PCT/US99/26698 filed Nov. 12, 1999, which claims priority rights based on U.S. Provisional Application Ser. No. 60/108,353 filed Nov. 13, 1998.

FIELD OF THE INVENTION

The present invention relates generally to computational devices and more particularly to a neural network computer requiring a minimal number of connective devices between processing elements.

BACKGROUND OF THE INVENTION

Artificial neural networks, or neurocomputers, are biologically inspired; that is, they are composed of elements that perform in a manner analogous to the most elementary functions of the biological neuron. Typically, a neurocomputer is composed of a number (n) of processing elements that may be switches or nonlinear amplifiers. These elements are then organized in a way that may be related to the anatomy of the brain. The configuration of connections, and thus communication routes, between these elements represents the manner in which the neurocomputer will function, analogous to that of a program performed by digital computers. Despite this superficial resemblance, artificial neural networks exhibit a surprising number of the brain's characteristics. For example, they learn from experience, generalize from previous examples to new ones, and abstract essential characteristics from inputs containing irrelevant data. Unlike a von Neumann computer, the neurocomputer does not execute a list of commands (a program). Rather, the neurocomputer performs pattern recognition and associative recall via self-organization of connections between elements.

Artificial neural networks can modify their behavior in response to their environment. Shown a set of inputs (perhaps with desired outputs), they self-adjust to produce consistent responses. A network is trained so that application of a set of inputs produces the desired (or at least consistent) set of outputs. Each such input (or output) set is referred to as a vector. Training is accomplished by sequentially applying input vectors, while adjusting network weights according to a predetermined procedure. During training, the network weights gradually converge to values such that each input vector produces the desired output vector.

Because of their ability to simulate the apparently oscillatory nature of brain neurons, oscillatory neurocomputers are among the more promising types of neurocomputers. Simply stated, the elements of an oscillatory neurocomputer consist of oscillators rather than amplifiers or switches. Oscillators are mechanical, chemical or electronic devices that are described by an oscillatory signal (periodic, quasi-periodic, almost periodic function, etc.). Usually the output is a scalar function of the form $V(\omega t+\phi)$ where V is a fixed wave form (sinusoid, saw-tooth or square wave), $\omega$ is the frequency of oscillation, and $\phi$ is the phase deviation (lag or lead).

Recurrent neural networks have feedback paths from their outputs back to their inputs. As such, the response of such networks is dynamic in that after applying a new input, the output is calculated and fed back to modify the input. The output is then recalculated, and the process is repeated again and again. Ideally, successive iterations produce smaller and smaller output changes until eventually the outputs become constant. To properly exhibit associative and recognition properties, neural networks, such as is required by Hopfield's network, must have a fully connected synaptic matrix. That is, to function optimally, recurrent network processing elements must communicate data to each other. Although some prototypes have been built, the commercial manufacture of such neurocomputers faces a major problem: A conventional recurrent neurocomputer consisting of n processing elements requires $n^2$ connective junctions to be fully effective. The terms connector or connective junction, as used herein throughout, are defined as a connective element that enables one processing element to receive as input data output data produced by itself or any other one processing element. For large n this is difficult and expensive.

Accordingly, a need exists for a neurocomputer with fully recurrent capabilities and requiring a minimal number of connective devices between processing elements.

SUMMARY OF THE INVENTION

In accordance with the present invention, a neurocomputer is disclosed that exhibits pattern recognition and associative recall capabilities while requiring only n connective junctions for every n processing elements employed thereby.

In a preferred embodiment of the invention, the neurocomputer comprises n oscillating processing elements that can communicate through a common medium so that there are required only n connective junctions. A rhythmic external forcing input modulates the oscillatory frequency of the medium which, in turn, is imparted to the n oscillators. Any two oscillators oscillating at different frequencies may communicate provided that the input's power spectrum includes the frequency equal to the difference between the frequencies of the two oscillators in question. Thus, selective communication, or dynamic connectivity, between different neurocomputer oscillators occurs due to frequency modulation of the medium by external forcing.

DESCRIPTION OF THE PREFERRED EMBODIMENT

Figure 1:
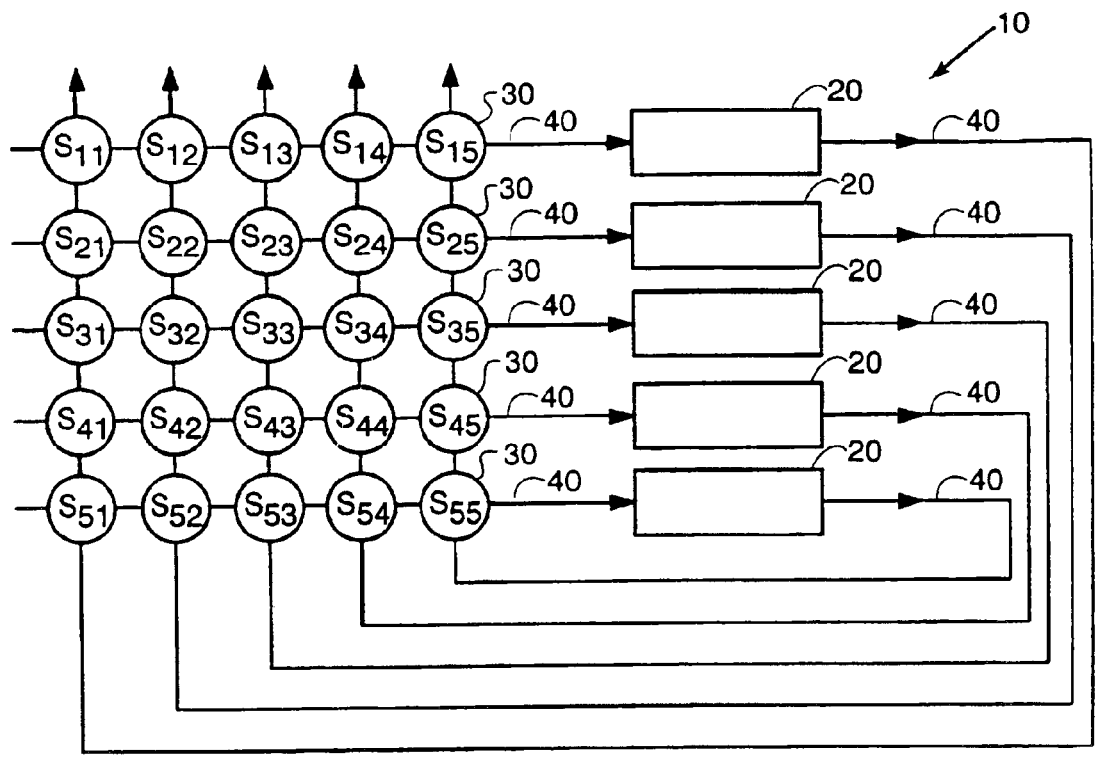
FIG. 1 is a schematic diagram of a prior art recurrent neural network employing five neural processing elements.

FIG. 1 schematically illustrates a conventional recurrent neurocomputer 10 comprising n (in this case, n=5) neural processing elements 20. Elements 20 may comprise switches, amplifiers, oscillators or any other suitable neurocomputer element type known in the art. In order for each of elements 20 to communicate with the others of elements 20, neurocomputer 10 necessarily includes $n^2$ (in this case, $n^2$=25) connective junctions 30 to which conductors 40 are attached. As can be observed, where the number n of elements 20 grows large, the implementation of such a neurocomputer becomes prohibitively difficult, from both cost and practicability standpoints.

Figure 2:
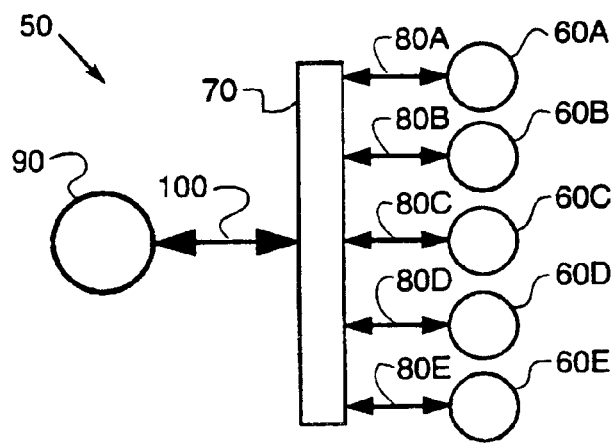
FIG. 2 is a schematic diagram of a neural network according to principles of the present invention and employing five neural processing elements.

FIG. 2 schematically illustrates a neurocomputer 50 according to principles of the present invention. Neurocomputer 50 comprises a finite number n (in this case, n=5) of oscillary neural processing elements 60A, 60B, 60C, 60D, and 60E. Elements 60A, 60B, 60C, 60D and 60E can comprise voltage-controlled oscillators, optical oscillators, lasers, microelectromechanical systems, Josephson junctions, macromolecules, or any other suitable oscillator known in the art. Each element 60A, 60B, 60C, 60D and 60E oscillates at a particular frequency that may or may not be the same frequency as that of the others of elements 60A, 60B, 60C, 60D and 60E. In its most general sense, the neurocomputer 50 further comprises a medium 70 connected to each of elements 60A, 60B, 60C, 60D and 60E by means of connective junctions 80A, 80B, 80C, 80D and 80E, respectively. Medium 70 may comprise a unitary body or multiple connected bodies. Neurocomputer 50 further comprises a rhythmic forcing signal source 90 able to apply a modulated oscillatory frequency to medium 70 by means of a connection 100. Specifically, the medium 70 can be a conductive medium electrically connected to the oscillators 60A, 60B, 60C, 60D and 60E by conductive connection junctions 80A, 80B, 80C, 80D and 80E. The rhythmic forcing signal source 90 can be an electrical signal generator such as a frequency modulated transmitter connected by a conductive connection 100 to the medium 70.

In operation, any two elements, such as 60B and 60E, can be said to communicate to each other if changing the phase deviation of one influences the phase deviation of the other. Such is the case if the two elements oscillate at the same frequency. Accordingly, if elements 60B and 60E oscillate at the same frequency, they will communicate in such manner.

If elements 60B and 60E oscillate at different frequencies, they will not communicate in such manner. However, by causing input signal source 90 to apply a uniform oscillatory signal multiplicatively to elements 60A, 60B, 60C, 60D and 60E by way of medium 70, any two oscillators, such as 60B and 60E, can be made to communicate by filling the frequency gap between them. That is, the uniform oscillatory signal must include a frequency equal to the difference between the respective frequencies of elements 60B and 60E. Accordingly, if elements 60B and 60E are oscillating at two different frequencies, say $\omega 1$ and $\omega 2$, then applying the time (t) dependent voltage signal $a(t)=\cos(\omega 1-\omega 2)t$ to medium 70 enables elements 60B and 60E to communicate data to each other.

Mathematical analysis of the said neurocomputer architecture, which is based on the theory developed by F. C. Hoppensteadt and E. M. Izhikevich (Oscillatory neurocomputers with dynamic connectivity, Physical Review Letters 82(1999)2983–2986) shows that the neurocomputer dynamic is equivalent to a fully connected Hopfield network (J. J. Hopfield, Neural networks and physical systems with emergent collective computational abilities, Proceedings of National Academy of Sciences (USA) 79(1982)2554–2558). In particular, we use the well-known Hebbian learning rule (D. O. Hebb, The Organization of Behavior, J. Wiley, New York, 1949; and S. Grossberg, Non-linear neural networks: Principles, mechanisms and architectures, Neural Networks 1(1988)17–61) to show that a network of n=60 oscillators can memorize and successfully retrieve through associative recall three patterns corresponding to the images "0", "1", "2", as we illustrate in FIG. 3. Thus, the neurocomputer can act as a classical fully connected Hopfield network despite the fact that it has only n interconnections.

Figure 8:
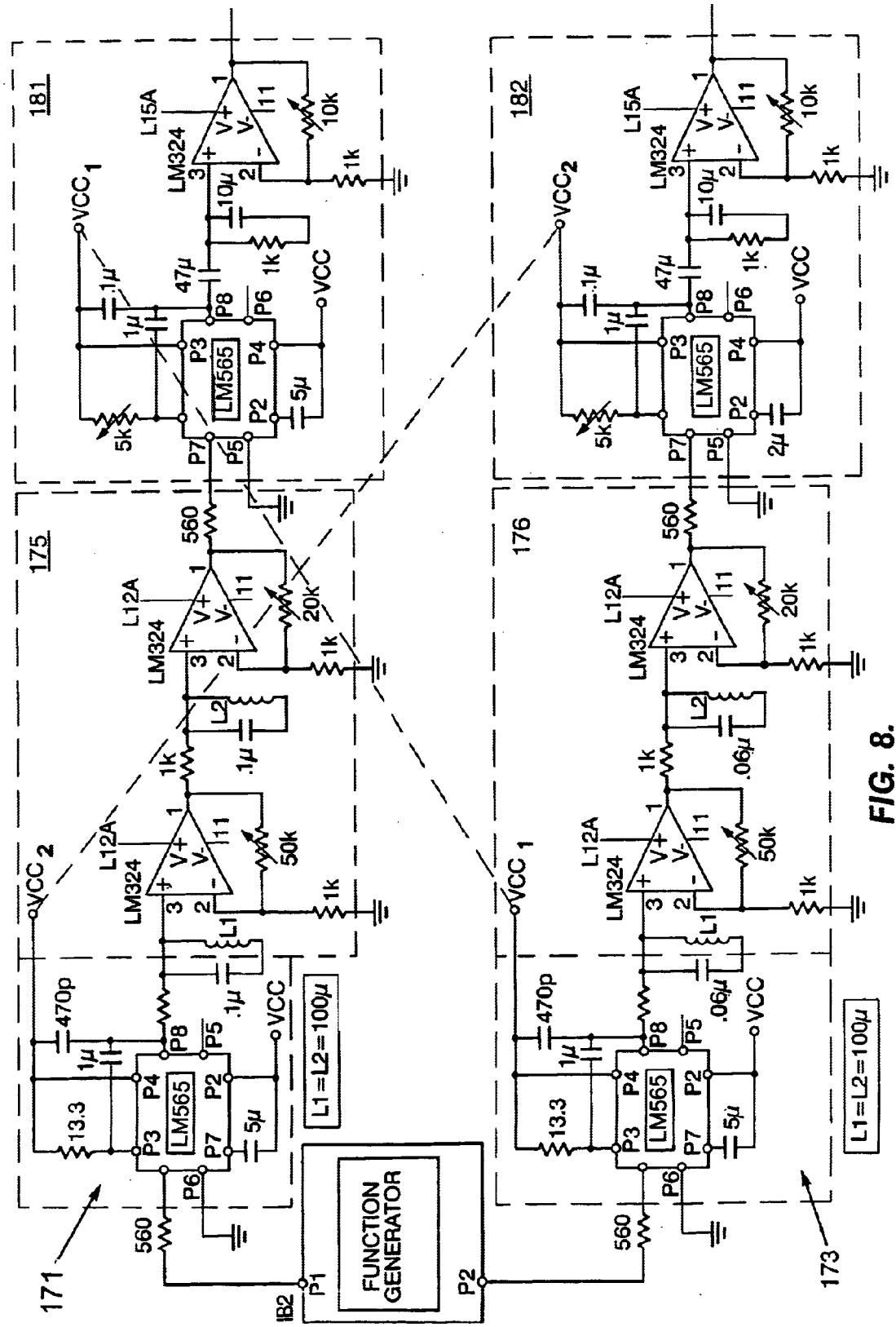
FIG. 8 is a schematic diagram showing the circuit components of the neural network of FIG. 6 according to principles of the present invention.

As discussed below, a neurocomputer according to principles of the present invention may be comprised mainly of phase-locked loops, amplifiers, and band-pass filters. A schematic of such a neurocomputer is shown in FIG. 8. In this discussion, emphasis will be placed on the operation of phase-locked loops, which are ideally designed to perform frequency demodulation and frequency multiplication. Because of these qualities, they are highly suited for simulating neuron interaction.

Figure 4:
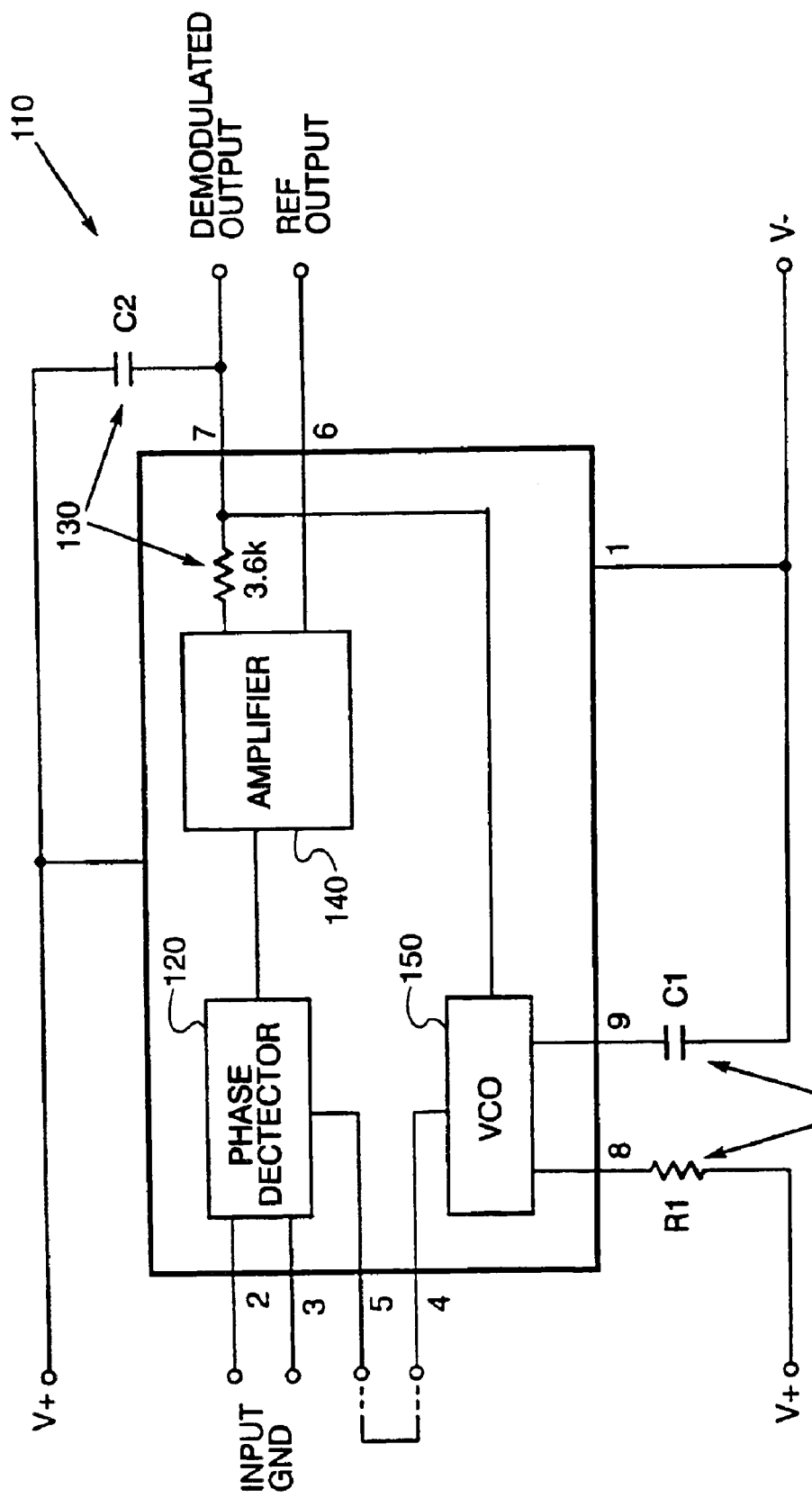
FIG. 4 is a schematic block diagram of a phase-locked loop.

A schematic of the major components of a phase locked loop ("PLL") 110 is shown in FIG. 4. The major components include a phase detector 120, low-pass filter 130, unity amplifier 140, and a voltage controlled oscillator ("VCO") 150. Phase locked loops use a feedback loop to produce a replica of an input signal's frequency. They are similar to operational amplifiers ("op-amps") in that an op-amp amplifies the voltage difference between input signals. The difference is that a PLL amplifies the frequency difference of the inputs and sets them equal to each other, so that the internally generated signal in the VCO 150 is an exact replica of the input signal (pin 4 of the PLL). Once this has occurred the PLL 110 is said to be in the "locked on" state. When the two signals are "locked on," any change in the input's frequency is detected by the phase detector 120 as an error signal. This error signal is applied to the internal signal, which is a replica of the input, so that it will match the input signal's frequency. The error signal is essentially the phase difference in the signal, which is the information waveform. The encoded information is extracted from pin 7 of the PLL 110. By implementing the above technique, frequency demodulation is performed using PLLs.

PLLs may be set up to perform frequency multiplication. This is accomplished by placing an open circuit between pins 3 and 4 in FIG. 4 and inputting a second source at pin 3. Since the phase detector 120 of PLL 110 is classified as type 1, it has a highly linear XOR gate and a built-in four-quadrant multiplier. The four-quadrant multiplier allows PLL 110 to perform frequency multiplication very accurately. A PLL connected in this manner produces an output that is the frequency multiplication of the two inputs.

Before simulating neuron activity using phase locked loop circuitry, one first establishes the free running frequency, the capture-range, and the lock-range of the PLL. The free running frequency ($f_o$) is ideally the center frequency level of the signal that is to be demodulated. The value for the free running frequency is obtained from $$f_o = 1.2/(4 \cdot R1 \cdot C1) \qquad (i)$$

It should be mentioned that the resistance R1 and the capacitance C1 correspond to the values of resistor R1 and capacitor C1 in FIG. 4. The capture-range ($f_c$) is the frequency range over which the PLL will try to lock on to an input's frequency. The following formula may be used to determine the capture-range.

$$f_c = 1/(2 \cdot \pi) \cdot \sqrt{((2 \cdot \pi \cdot f_L)/(3.6 \cdot 1000 \cdot C2))} \qquad (ii)$$

where C2 is the capacitance of the similarly designated capacitor in FIG. 4 and $f_L$ is the lock-range.

By evaluating the formula for the capture range, one can see that the capture range is limited by the low pass filter time constant. The lock-range ($f_L$) is the range over which the PLL will remain in the locked on state. This range is generally larger than the capture-range and can be increased by increasing Vcc of the PLL as shown in the following equation.

$$f_L = 8 \cdot f_o/Vcc \qquad (iii)$$

Figure 5:
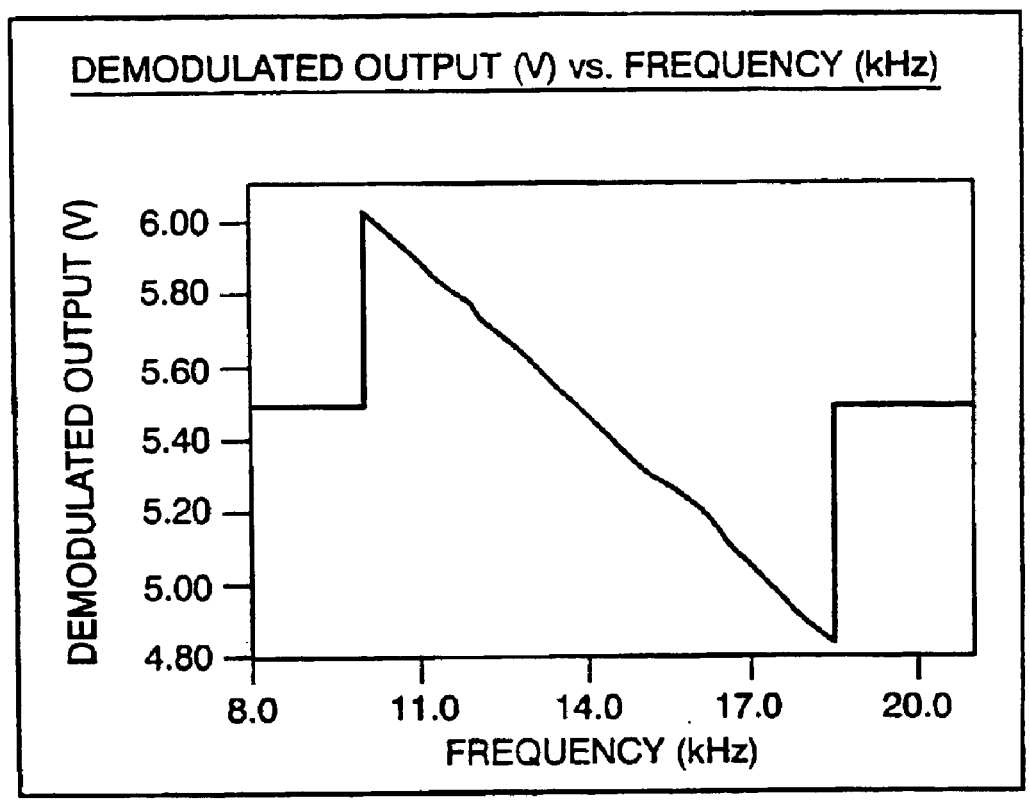
FIG. 5 is a diagrammatic illustration of the relationship between demodulated output voltage and input frequency and phase of a phase-locked loop as depicted in FIG. 4.

After establishing the free running, lock and capture frequencies, it should be determined if there exists a linear relationship between the input frequency and phase, and the demodulated output voltage. This linear relationship can be determined and demonstrated as shown in FIG. 5.

Figure 6:
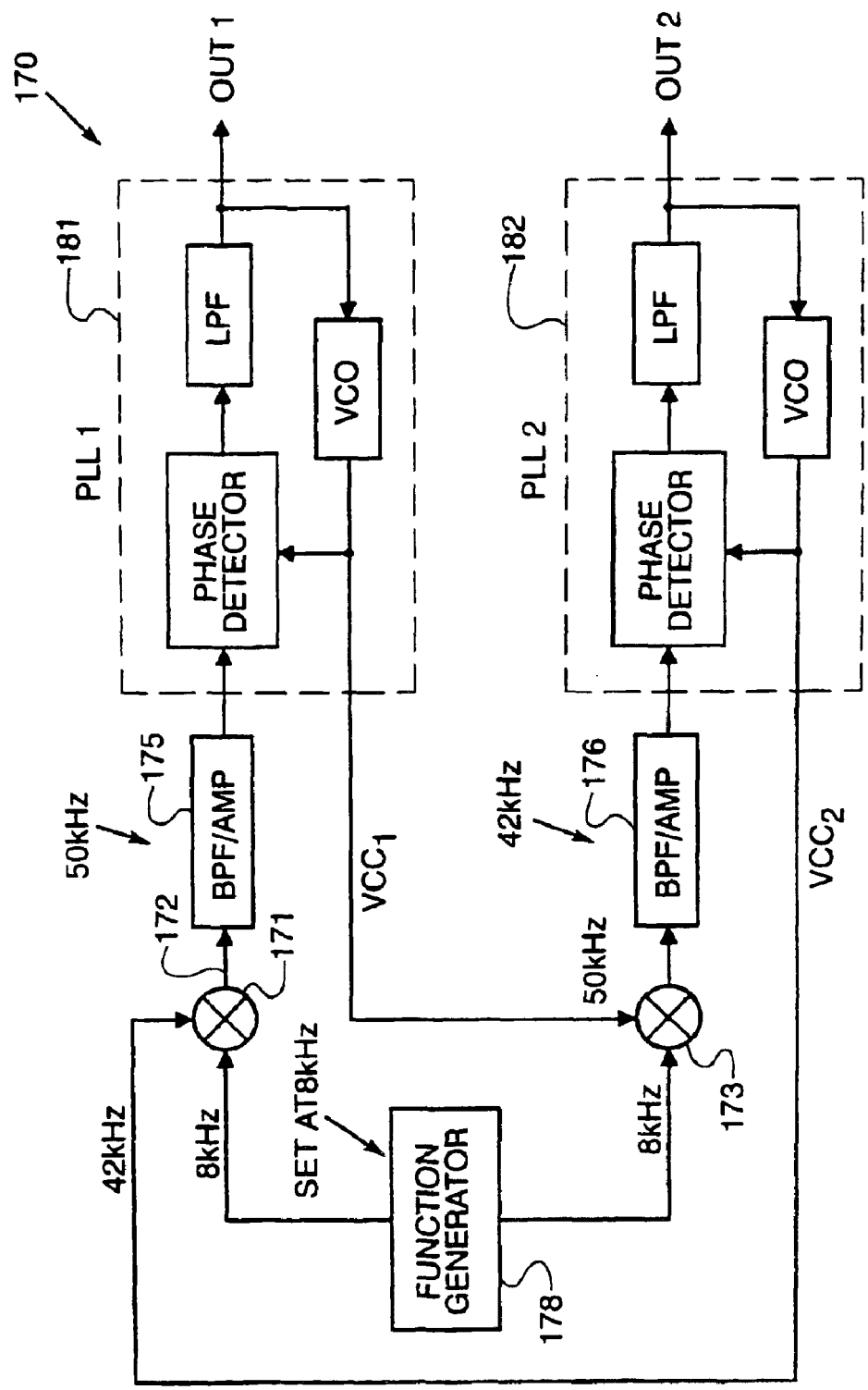
FIG. 6 is a schematic block diagram of a neural network according to principles of the present invention employing two phase-locked loops as depicted in FIG. 4.

Communication can occur when a signal is outside the capture range if it is conditioned by another signal. This can be demonstrated by implementing the multiple PLL circuit 170 as shown in FIG. 6. The key to designing the circuit depicted in FIG. 6 is the ability to obtain the sum and difference of two input frequencies, which can be accomplished through multiplication.

In order to implement the multiplication operation as shown by the multiplication circle 171 or 173, one should understand the following theory:

$$\cos(\omega c) \cos(\omega m) = (\tfrac{1}{2}) \cdot [\cos(\omega c - \omega m) + \cos(\omega c + \omega m)]$$

→Fourier Transform→

$$(\tfrac{1}{4}) \cdot [\delta(f + (fc - fm)) + \delta(f + (fc + fm)) + \delta(f - (fc - fm)) + (f - (fc + fm))]$$

Figure 7:
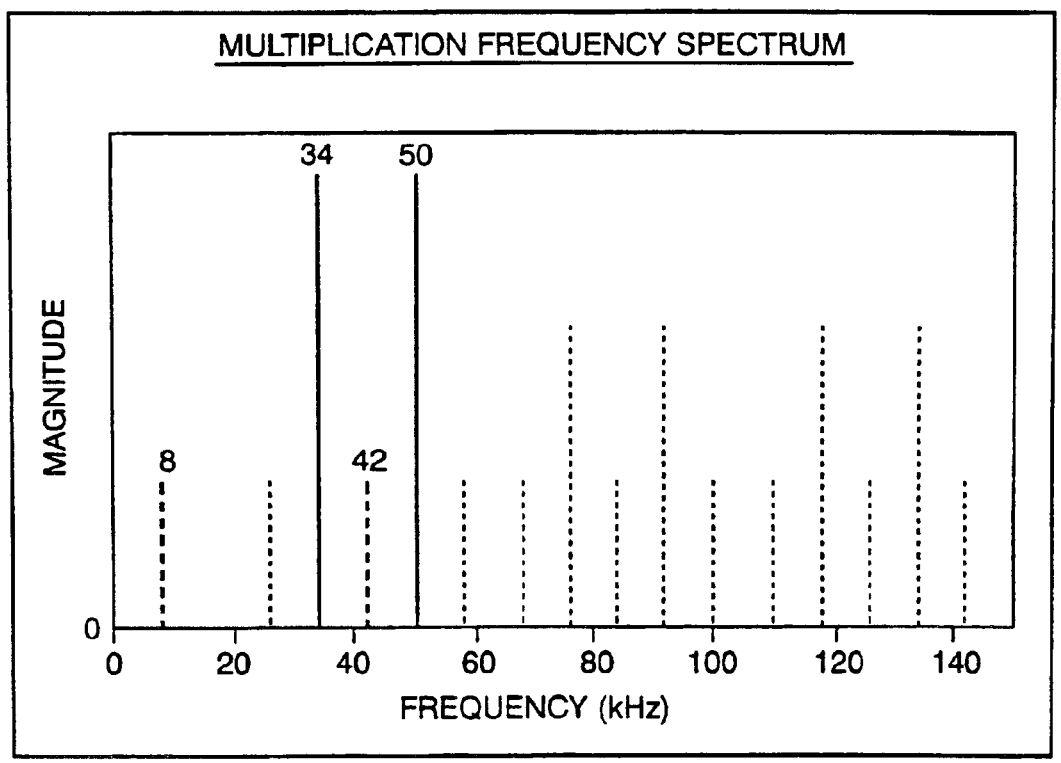
FIG. 7 is a diagrammatic illustration of one frequency multiplication performed in the neural network depicted in FIG. 6.

FIG. 7 shows what occurs when multiplying 8 kHz and 42 kHz, as at the multiplier 171 in FIG. 7. As seen in FIG. 7, these 8 kHz and 42 kHz components are present in the output 172 of the multiplier 171. Also present are 50 kHz and 34 kHz, the sum and difference of 8 kHz and 42 kHz, respectively. Interfering harmonics are also present. Here, 8 kHz and 42 kHz were chosen to obtain an adequate separation between the harmonics and the desired frequency components.

To resolve the problem of harmonic frequencies output by the multipliers 171, 173, band pass filters were placed in the circuit. The filter was comprised of an inductor and capacitor. To isolate the single frequency desired, the following formula was used:

$$f = 1/(\sqrt{(L \cdot C \cdot 2 \cdot \pi)}) \qquad (iv)$$

This formula was used to choose the desired inductor and capacitor needed. A problem resulting from the addition of the band pass filter was a voltage drop of the input signal. To compensate for this drop, amplifiers were inserted into the circuit to raise the voltage back up to the desired magnitude. The band pass filter amplifier circuits thus added are indicated at 175, 176 of FIG. 6.

By modulating the 8 kHz carrier frequency of the function generator 178 with a 100 Hz sine wave modulation and multiplying the modulated signal with a 42 kHz carrier frequency, the PLL 181 was able to demodulate the input signal and output the 100 Hz information signal. Similarly, the PLL 182 was able to demodulate the 100 Hz information signal. Testing of the circuit depicted in FIG. 6 demonstrates that communication can still occur even if a signal is outside the capture range of a PLL if the information signal is combined with another carrier signal.

In FIG. 8, the circuit shown in block diagram form in FIG. 6 is schematically shown in greater detail. The multipliers 171 and 173 are LM 565 phase locked loops from National Semiconductor. National Semiconductor op amps LM 324 are used in the band pass filter and amplification stages 175 and 176 along with the inductor and capacitor filtering circuit elements of the values shown. The phase locked loops 181 and 182 connected as oscillators employ the LM 565 phase locked loops from National Semiconductor. $VCC_1$ from the PLL oscillator 181 at the upper right, is fed back to the multiplier 173 at the lower left and $VCC_2$ is fed back from the PLL oscillator 182 at the lower right to the multiplier 171 at the upper left.

Figure 9:
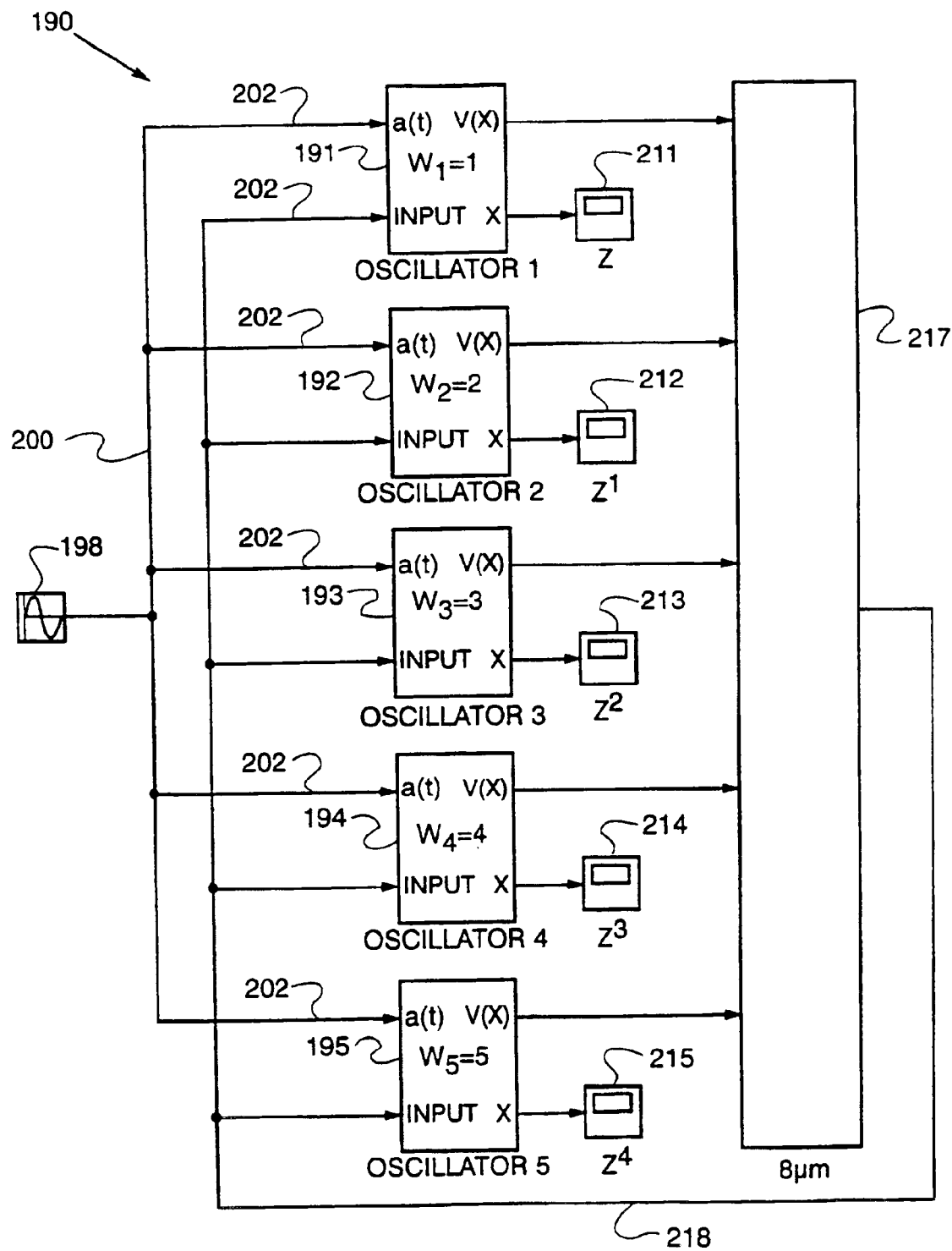
FIG. 9 is a schematic block diagram of a five-oscillator neural network with associated function generator and oscilloscopes connected for testing.
Figure 10A:
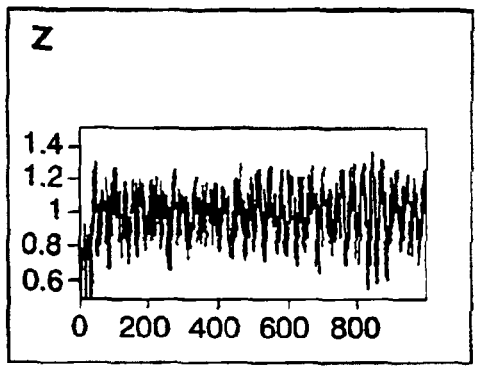
FIGS. 10A–10E are oscilloscope traces of the oscillator responses of the network of FIG. 9 with a signal sin t impressed on the input.
Figure 10B:
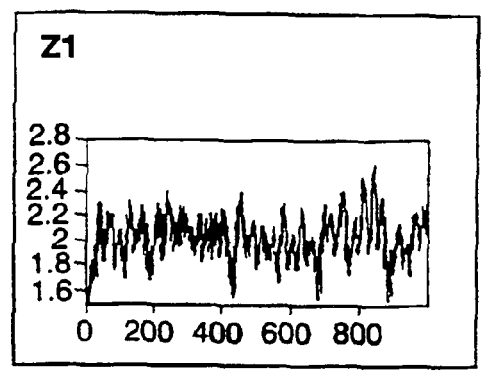
Figure 10C:
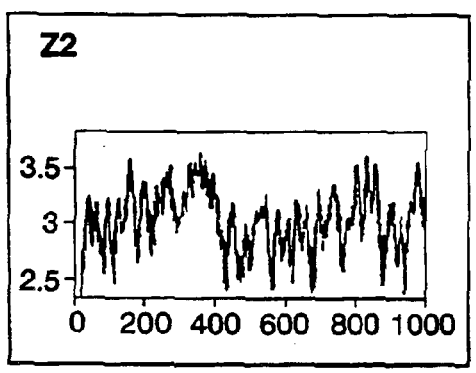
Figure 10D:
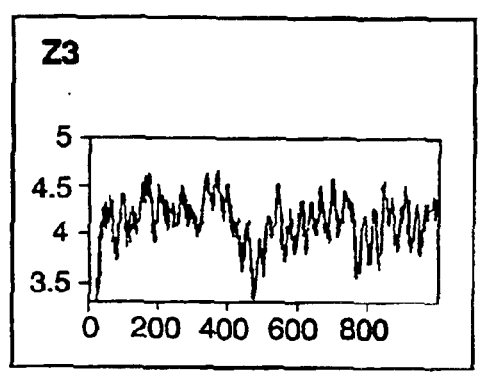
Figure 10E:
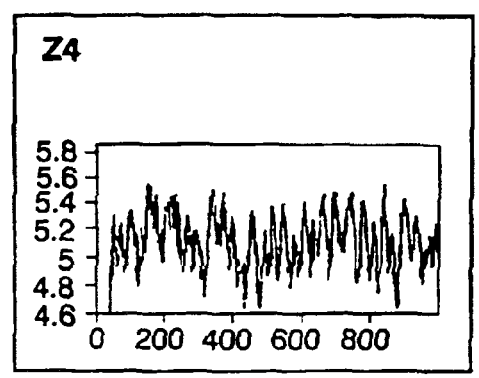
Figure 11A:
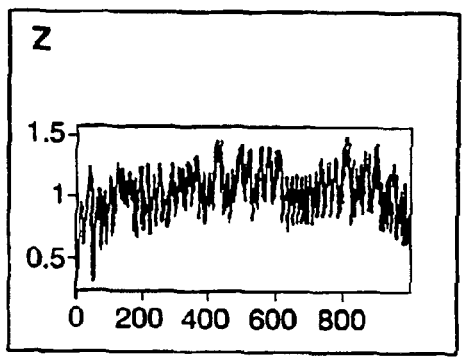
FIGS. 11A–11E are oscilloscope traces of the oscillator responses of the network of FIG. 9 with a signal sin 2t impressed on the input.
Figure 11B:
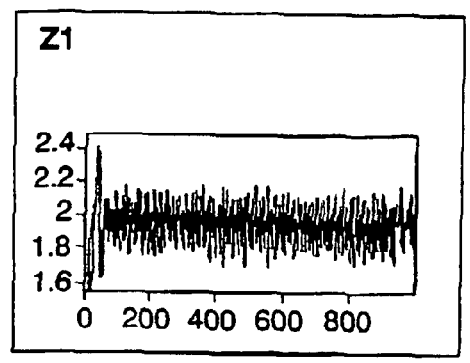
Figure 11C:
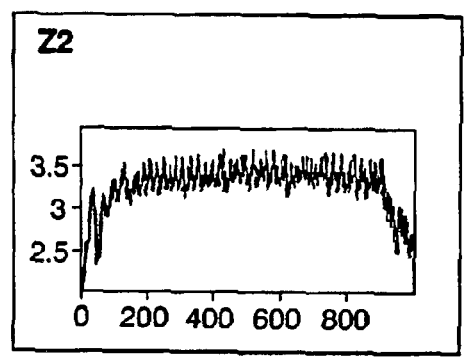
Figure 11D:
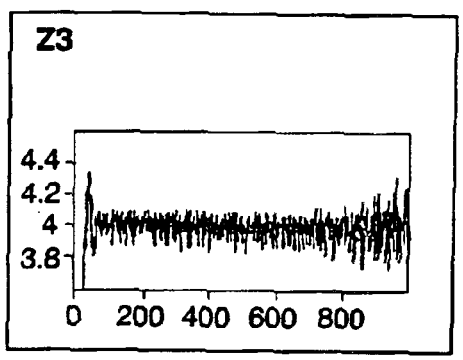
Figure 11E:
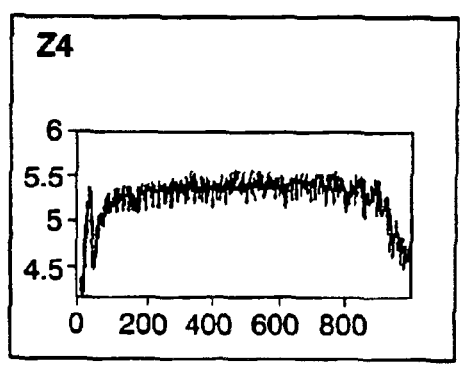
Figure 12A:
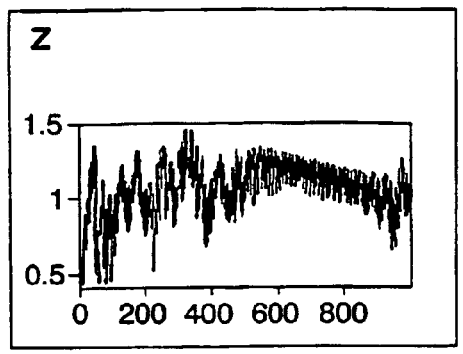
FIGS. 12A–12E are oscilloscope traces of the oscillator responses of the network of FIG. 9 with a signal sin 3t impressed on the input.
Figure 12B:
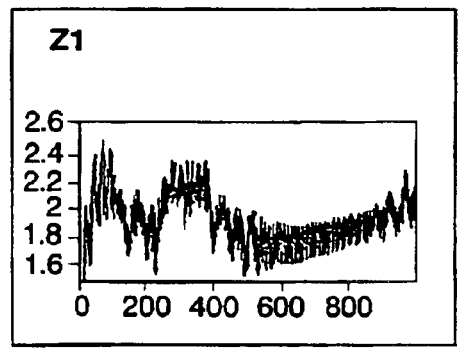
Figure 12C:
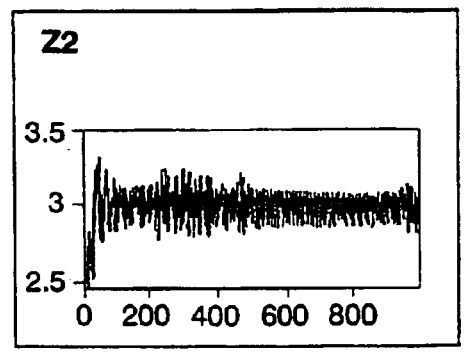
Figure 12D:
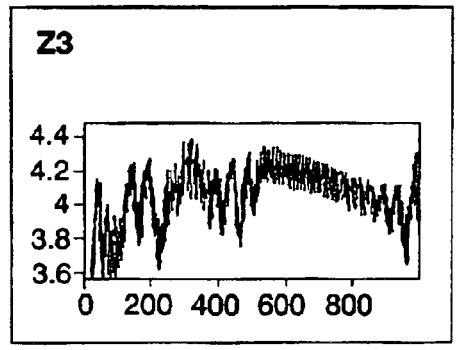
Figure 12E:
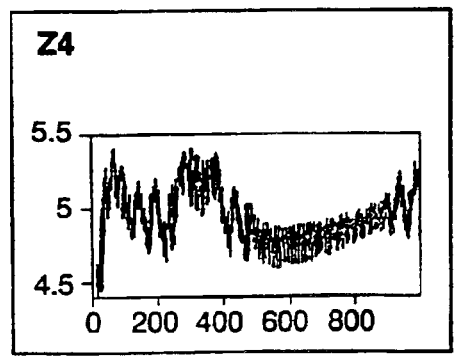
Figure 13A:
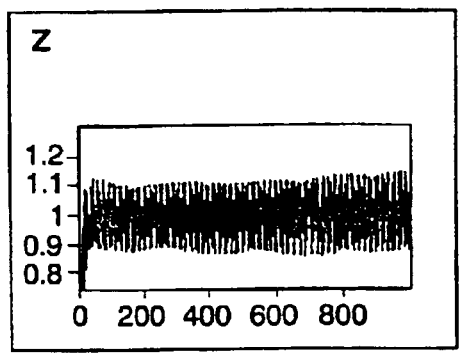
FIGS. 13A–13E are oscilloscope traces of the oscillator responses of the network of FIG. 9 with a signal sin 10t impressed on the input.
Figure 13B:
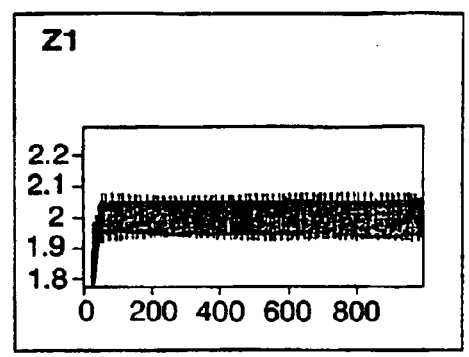
Figure 13C:
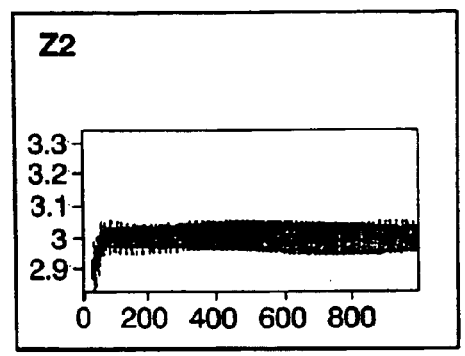
Figure 13D:
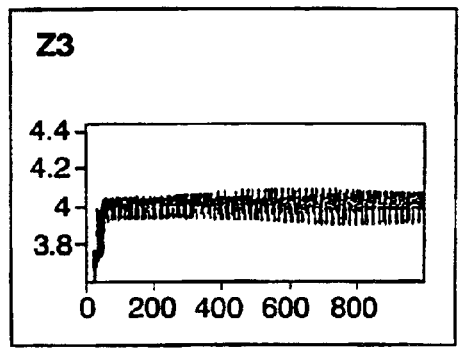
Figure 13E:
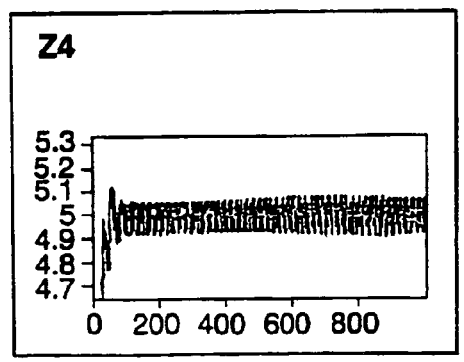

In FIG. 9, a five-element neural network 190 is shown. Five phase locked loop oscillators 191, 192, 193, 194 and 195 are tuned at frequencies $W_1$, $W_2$, $W_3$, $W_4$, $W_5$, respectively, where the ratio of frequencies is $W_1:W_2:W_3:W_4:W_5=1:2:3:4:5$. These oscillators are forced by a common function generator 198. The function generator is connected to the oscillators via the conductors 200 and 202 serving as the conductive medium and connectors, respectively, of the neural network 190 previously discussed. Oscilloscopes 211, 212, 213, 214, and 215 are connected to the oscillators as illustrated to demonstrate the output signals of the oscillators responsive to various inputs from the function generator 198. A summing circuit 217 is connected into a feedback loop 218 common to each of the oscillators.

FIGS. 10–13 illustrate the responses of the oscillators 191–195, respectively, to four input signals generated by the function generator 198. FIG. 10 shows the traces of the oscilloscopes 211–215 corresponding to the oscillating signals of oscillators 191–195, respectively, when the forcing voltage from the function generator 198 is sin t. None of the oscillators 191–195 are in communication and the oscillator signals are unrelated, as shown by the traces 10A–10E.

With a function generator input sin 2t, the oscillators respond with signals as shown by the traces of FIGS. 11A to 11E. Here, the oscillators 191, 193 and 195 communicate, producing the oscilloscope traces of FIGS. 11A, 11C and 11E, and the oscillators 192 and 194 communicate producing the traces of FIGS. 11B and 11D.

With an input signal sin 3t impressed by the function generator 198, the oscillators 191–195 produce in the oscilloscopes 211–215 the traces shown at FIGS. 12A–12E, respectively. Oscillators 191 and 194 communicate, producing the traces of FIGS. 12A and 12D. Oscillators 192 and 195 communicate producing the traces shown at FIGS. 12B and 12E. The oscillator 193 is not in communication with any other of the oscillators and it produces the trace shown at FIG. 12C.

In FIGS. 13A–13E, shown are traces illustrating the response of the oscillators 191–195 when a signal sin 10t is impressed by the function generator 198. None of the oscillators here are communicating.

A further, more generalized example of implementation of the present invention will now be described using a network of n voltage controlled oscillators (known as Kuramoto's phase model) and represented by:

$$\dot{v}_i = \Omega_i + \varepsilon a(t) \sum_{j=1} \sin(\vartheta_j - \vartheta_i), \quad (1)$$

where $\dot{v}_i \in S^1$ is the phase of the ith oscillator, a(t) is the external input and $\in \ll 1$ is the strength of connections. We require that all differences $\Omega_i - \Omega_j$ be different when $i \neq j$.

(i) Averaging

Let $\dot{v}_i(t) = \Omega_i t + \phi_i$; then $$\dot{\varphi}_i = \varepsilon a(t) \sum_{j=1}^{n} \sin(\{\Omega_j - \Omega_i\}t + \varphi_j - \varphi_i). \quad (2)$$

One can average this system to obtain $$\phi_i = \in H_i(\phi_1, \ldots, \phi_n) + o(\in), \quad (3)$$

where $$H_i = \lim_{T \to \infty} \frac{1}{T} \int_0^T a(t) \sum_{j=1}^{n} \sin(\{\Omega_j - \Omega_i\}t + \varphi_j - \varphi_i) dt$$

is the average of the right-hand side of (2).

(ii) Quasiperiodic External Input

Now suppose we are given a matrix of connections $C=(c_{ij})$. Let $$a(t) = a_0 + \sum_{i=1}^{n} \sum_{j=1}^{n} c_{ij} \cos(\{\Omega_j - \Omega_i\}t) \quad (4)$$

be a time dependent external input, which is a quasiperiodic function of t. Since all $1\Omega_i - \Omega_j$ differences are different for all i and j, it is easy to verify that $$H_i = \sum_{j=1}^{n} \frac{c_{ij} + c_{ji}}{2} \sin(\varphi_j - \varphi_i).$$

If we denote $s_{ij} = (c_{ij} + c_{ji})/2$, use the slow time $\tau = \in t$, and disregard the small-order term $o(\in)$, then we can rewrite system (2) in the form $$\varphi_i' = \sum_{j=1}^{n} s_{ij} \sin(\varphi_j - \varphi_i), \quad (5)$$

where $' = d/d\tau$. We see that the external input of the form (4) can dynamically connect any two oscillators provided that the corresponding $c_{ij}$ is not zero.

(iii) Chaotic External Input

In general, the external input a(t) can be chaotic or noisy. It can dynamically connect the ith and jth oscillators if its Fourier transform has a non-zero entry corresponding to the frequency $\omega = \Omega_j - \Omega_i$ since the average $H_i$, would depend on the phase difference $\phi_j - \phi_i$ in this case.

(iv) Oscillatory Associative Memory

Figure 3:
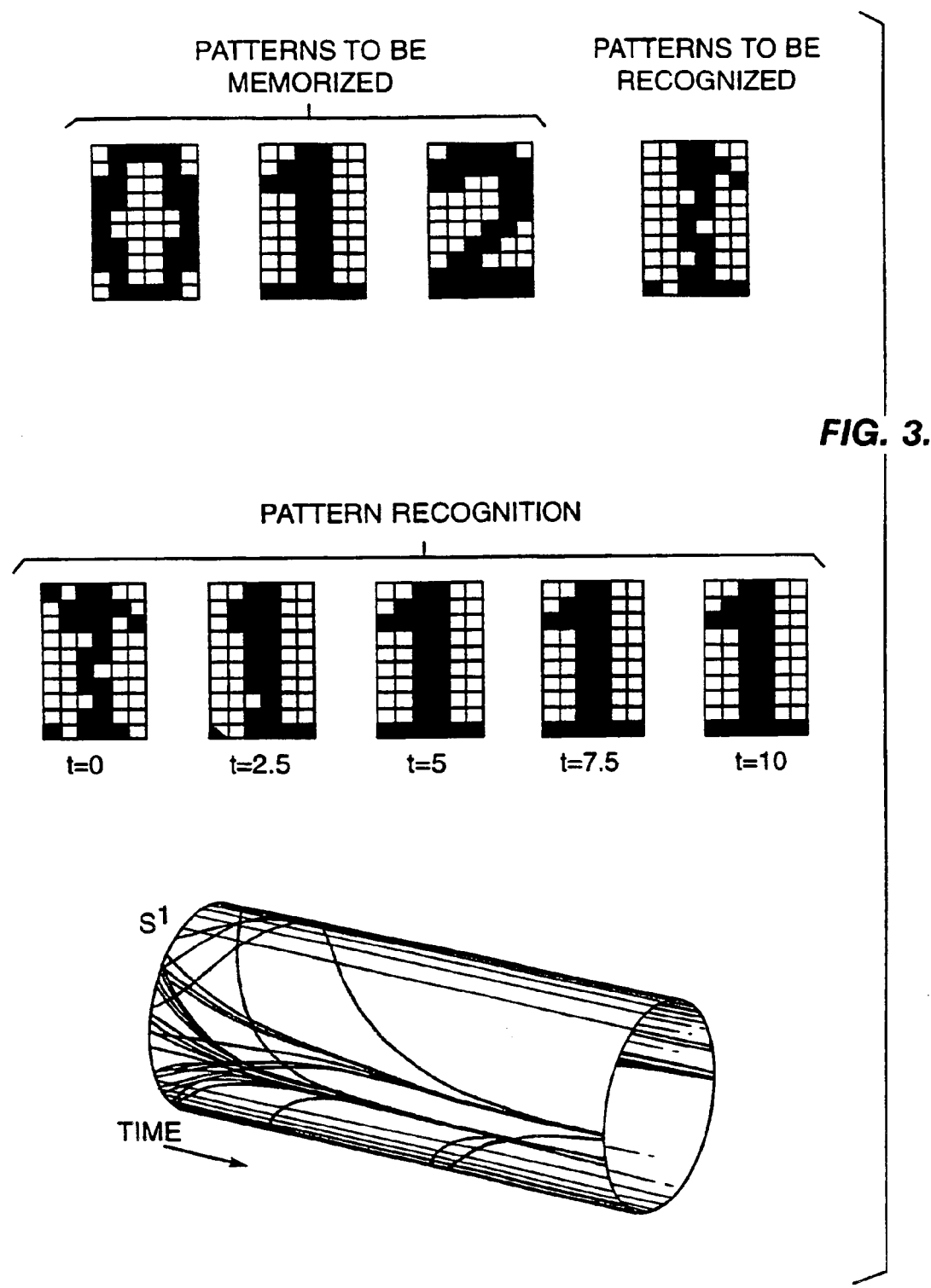
FIG. 3 is a diagrammatic illustration of results obtained through simulation of the neurocomputer according to principles of the present invention using a phase deviation model and Hebbian learning rule with parameters: n=60, t∈[0, 10].

Since the connection matrix $S=(s_{ij})$ is symmetric, the phase model (5) is a gradient system, Indeed, it can be written in the form $$\varphi_i' = \frac{\partial U}{\partial \varphi_i} \text{ where } U(\varphi_1, \ldots, \varphi_n) = -\frac{1}{2} \sum_{i=1}^{n} \sum_{j=1}^{n} s_{ij} \cos(\varphi_j - \varphi_i)$$

is a gradient function. The vector of phase deviations $\phi = (\phi_1, \ldots, \phi_n) \in \tau^n$ always converges to an equilibrium on the n-torus $\in \tau^n$ as shown in FIG. 3. System (5) has multiple attractors and Hopfield-Grossberg-like associative properties as also shown in FIG. 3. Therefore, system (1) with external forcing has oscillatory associative memory.

(v) Hebbian Learning Rule

Suppose we are given a set of m key vectors to be memorized $$\xi^k = (\xi_1^k, \xi_2^k, \ldots, \xi_n^k), \xi_1^k == 1, k = 1, \ldots, m,$$

where $$\xi_i^k = \xi_j^k$$

means that the ith and jth oscillators are in-phase ($\phi_i = \phi_j$), and $$\xi_i^k = -\xi_j^k$$

means they are anti-phase (100 $_i = \phi_j + \pi$). A Hebbian learning rule of the form $$s_{ij} = \frac{1}{n} \sum_{k=1}^{m} \xi_i^k \xi_j^k, \quad (6)$$

is the simplest one among many possible learning algorithms. To get (5) it suffices to apply the external input of the form (4) with $c_{ij} = s_{ij}$ for all i and j.

(vi) Initializing the Network

To use the proposed neurocomputer architecture to implement the standard Hopfield-Grossberg paradigm, as we illustrate in FIG. 3, we need a way to present an input image as an initial condition $\dot{v}^{(0)}$, and to read the output from the network. While the latter task poses no difficulty and can be accomplished using Fourier analysis of the "mean field activity," the former task requires some ingenuity since we do not have direct access to the oscillators.

Let us apply the external input a(t) with $c_{ij} = \in_i^0 \in_j^0$ for a certain period of time.

$$\varphi_i' = \sum_{j=1}^{n} \xi_i^0 \xi_j^0 \sin(\varphi_j - \varphi_i)$$

It is easy to check that if, $$\xi_i^0 \xi_j^0 = 1$$

then $\phi_i(t)-\phi_j(t) \to 0$, and if $$\xi_i^0 \xi_j^0 = -1$$

then $\phi_i(t)-\phi_j(t) \to \pi$ for all i and j. Thus, the network activity converges to the equilibrium having phase relations defined by the vector $\xi^0$, as shown in FIG. 3. When we restore the original external input a(t), which induces the desired dynamic connectivity, the recognition starts from the input image $\xi^0$. (We added noise to the image $\xi^0$, shown in FIG. 3 to enhance the effect of convergence to an attractor during recognition.)

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An oscillatory neurocomputer comprising:
   a number n of oscillating elements;
   a source of a rhythmic forcing input;
   a medium interconnecting the source of rhythmic forcing input to each oscillating element;
   each oscillating element having an oscillating frequency,
   the oscillating frequency $f_1$ of at least one of the oscillating elements differing from the oscillating frequency $f_2$ of at least one other of the oscillating elements,
   the source of a rhythmic forcing input producing an input of a third frequency $f_3$, establishing communication between the at least one oscillating element and the at least one other oscillating element.

2. An oscillatory neurocomputer according to claim 1, wherein $f_3$ is substantially the difference between $f_1$ and $f_2$.

3. An oscillatory neurocomputer according to claim 1, wherein the oscillating elements are electronic oscillators, the source of a rhythmic forcing input is a function generator and the interconnecting medium is an electrically conductive medium electrically connecting the source of a rhythmic forcing input to the oscillators.

4. An oscillatory neurocomputer according to claim 3, wherein the function generator provides a forcing signal having a carrier frequency and information content modulating the carrier frequency, the oscillators responding to the impression of the forcing signal onto the conductive medium to produce information content modulation substantially the same as that of the conductive medium.

5. An oscillatory neurocomputer according to claim 3, wherein content varying one oscillator from its oscillating frequency is communicated to and varies from its oscillating frequency another oscillator in communication with the one oscillator.

6. An oscillatory neurocomputer according to claim 1, wherein the number n of oscillating elements is greater than two, a first subset of the oscillating elements communicate at a frequency $f_3$ of rhythmic forcing input from the source, and at least one second subset of the oscillating elements communicate at least one further frequency $f_4$ of rhythmic forcing input from the source.

7. A neurocomputer including:
   a) an array of oscillators, at least a plurality of said oscillators having differing frequencies,
   b) a common conducting medium connected to each of the plurality of oscillators,
   c) a source connected to the conducting medium to impart oscillator signals of various frequencies to the conducting medium, the signals of various frequencies including frequencies effective to bring two or more of the oscillators into communication.

8. An oscillatory neurocomputer according to claim 7, wherein the oscillators include feedback circuits connected with the medium.

9. An oscillatory neurocomputer according to claim 8, wherein the oscillators are phase locked loops.

10. A method of enabling communication of a characteristic between a first processing element oscillating at a first frequency and a second processing element oscillating at a second frequency different from the first frequency, the method comprising the steps of:
    operably coupling the first element to a medium;
    operably coupling the second element to said medium;
    operably coupling said medium to a rhythmic input; and
    causing said rhythmic input to oscillate said medium at a third frequency.

11. The method of claim 10, wherein:
    said third frequency comprises a frequency substantially equal to the difference between the first frequency and the second frequency.

12. A method of enabling communication of a characteristic between a plurality of n oscillating processing elements comprising the steps of:
    operably coupling each of the plurality of n elements to a corresponding one of a plurality of no more than n connectors;
    operably coupling each one of said connectors to a conductive medium; and
    operably coupling said medium to a rhythmic input.

13. A neurocomputer comprising:
    (a) n processing elements including n oscillators having differing frequencies,
    (b) a common medium,
    (c) only n connective junctions coupling n inputs of the n processing units to the common medium, and
    (d) a rhythmic external forcing input coupled to the common medium to impart an oscillatory input to the medium and via the medium to the processing elements, whereby any two oscillators of differing frequency communicate when the frequency spectrum of the oscillatory input imparted by the rhythmic external forcing input includes a frequency equal to the difference between the frequencies of the two oscillators.

14. The neurocomputer of claim 13, wherein the common medium comprises a unitary body.

15. The neurocomputer according to claim 14, wherein the unitary body is an electrically conductive body.

16. The neurocomputer according to claim 15, wherein the frequency multipliers are additional phase-locked loops configured to be frequency multipliers.

17. The neurocomputer according to claim 13, wherein the common medium is comprised of multiple connected bodies.

18. The neurocomputer according to claim 17, wherein the multiple connected bodies are electrically conductive bodies electrically interconnected.

19. The neurocomputer according to claim 13, wherein the oscillators comprise phase-locked loops.

20. The neurocomputer according to claim 19, wherein the phase-locked loops comprise a phase detector, operatively connected to a low-pass filter and a voltage controlled oscillator.

21. The neurocomputer according to claim 20, wherein the processing elements further comprise a frequency multiplier operatively connected between the common medium and the phase-locked loop, and at least one interconnection operatively connecting an output of the voltage controlled oscillator of the phase-locked loop of one processing element to the frequency multiplier of another processing element.

22. The neurocomputer according to claim 21, further comprising a further interconnection operatively connecting the voltage controlled oscillator of the another processing element and the frequency multiplier of the one processing element.

23. The neurocomputer according to claim 21, wherein the rhythmic external forcing input comprises an information signal modulating a carrier frequency signal.

24. The neurocomputer according to claim 19, wherein each processing elements further comprise a frequency multiplier operatively connected between the common medium and the phase-locked loop.

25. The neurocomputer according to claim 24, wherein the processing elements further comprise a band-pass filter operatively connected between the frequency multiplier and the phase-locked loop.

26. The neurocomputer according to claim 25, wherein the processing elements further comprise an amplifier operatively coupled between the band-pass filter and the phase-locked loop.

27. The neurocomputer according to claim 19, wherein the rhythmic external forcing input comprises an information signal having a frequency outside the capture range of the phase-locked loops modulating a carrier frequency signal.

28. The neurocomputer according to claim 13, further comprising an adder circuit operably connected in a feedback path from outputs of the processing elements to the common medium.

29. A neurocomputer comprising:
(a) a multiple number n of means for processing, including;
 (i) a number n of means for receiving inputs to the means for processing,
 (ii) means for oscillating at differing frequencies,
 (iii) means for providing outputs from the means for processing,
(b) means for producing a rhythmic input,
(c) a single means connected with an output of the rhythmic input producing means for providing a common connection from the rhythmic input producing means to the n means for receiving inputs to the means for processing, and
(d) the means for producing a rhythmic input comprising means for producing inputs having frequency components that are the differences of frequencies of two or more of the means for oscillating of the means for processing.

30. The neurocomputer according to claim 29, further comprising means for multiplying a frequency of the means for producing a rhythmic input by a frequency of an oscillating means of one of the means for processing and for applying frequency multiplication as an input to at least one other of the means for processing.

31. The neurocomputer according to claim 29, further comprising means for adding frequencies of outputs of the means for processing and means for applying the added frequencies as feedback to the means for producing a rhythmic input.

32. A method of neurocomputing comprising:
(a) providing n processing elements including n oscillators having differing frequencies;
(b) providing a common medium;
(c) coupling n inputs of the n processing units to the common medium with only n connective junctions;
(d) applying a rhythmic external forcing input to the common medium to impart an oscillatory input to the medium and via the medium to the processing elements;
(e) effecting communication between at least two of the n processing elements by providing in the oscillatory input a frequency spectrum that includes a frequency equal to the difference between the frequencies of the at least two oscillators.

33. The method of neurocomputing according to claim 32, wherein step (b) comprises providing a unitary body, and step (c) comprises coupling n inputs of the n processing units to the unitary body.

34. The method of neurocomputing according to claim 33, wherein providing a unitary body comprises providing an electrically conductive body.

35. The method of neurocomputing according to claim 33, wherein step (b) comprises providing multiple connected bodies.

36. The method of neurocomputing according to claim 35, wherein providing multiple connected bodies comprises providing multiple electrically connected electrically conductive bodies.

37. The method of neurocomputing according to claim 32, wherein step (a) comprises providing as the processing elements phase detection of inputs to the processing elements.

38. The method of neurocomputing according to claim 37, wherein providing phase detection comprises providing phase-locked loops as the processing elements.

39. The method of neurocomputing according to claim 32, further comprising multiplying the rhythmic external forcing input by a signal having the frequency of at least one of the oscillators of at least one of the processing elements to form a multiplied output, and applying the multiplied output as an input to at least another of the oscillators of at least another of the processing elements.

40. The method of neurocomputing according to claim 32, further comprising adding together outputs of the processing elements and applying the added together outputs as feedback to the common medium.

41. The method of neurocomputing according to claim 39, further comprising filtering the multiplied output with a band pass filter prior to applying the multiplied output to the at least another oscillator.

42. The method of neurocomputing according to claim 32, wherein step (d) comprises modulating a carrier signal with an information signal.

\* \* \* \* \*